(12) United States Patent
Sethi (10) Patent No.: US 7,454,525 B1
(45) Date of Patent: Nov. 18, 2008

(54) ENABLING COMMUNICATION WHEN SIGNALING PROTOCOL PACKETS CONTAIN EMBEDDED ADDRESSES SUBJECT TO TRANSLATION

(75) Inventor: Aseem Sethi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 899 days.

(21) Appl. No.: 10/309,887

(22) Filed: Dec. 5, 2002

(51) Int. Cl.
*G06F 15/16* (2006.01)

(52) U.S. Cl. ............... 709/245; 709/236; 370/392

(58) Field of Classification Search ......... 709/245, 709/242, 238, 236; 370/389, 392
See application file for complete search history.

(56) References Cited

U.S. PATENT DOCUMENTS

| | | | | |
|---|---|---|---|---|
| 6,493,765 B1* | 12/2002 | Cunningham et al. | ....... | 709/245 |
| 6,496,867 B1* | 12/2002 | Beser et al. | ....... | 709/245 |
| 6,917,626 B1* | 7/2005 | Duvvury | ....... | 370/466 |
| 6,988,148 B1* | 1/2006 | Sheth | ....... | 709/245 |
| 7,139,841 B1* | 11/2006 | Somasundaram et al. | ... | 709/245 |
| 2001/0043571 A1* | 11/2001 | Jang et al. | ....... | 370/260 |
| 2001/0053156 A1* | 12/2001 | Higuchi et al. | ....... | 370/466 |
| 2002/0156867 A1* | 10/2002 | Iwami | ....... | 709/218 |
| 2002/0159447 A1* | 10/2002 | Carey et al. | ....... | 370/389 |
| 2002/0165982 A1* | 11/2002 | Leichter et al. | ....... | 709/244 |
| 2003/0110292 A1* | 6/2003 | Takeda et al. | ....... | 709/245 |
| 2003/0154410 A1* | 8/2003 | Drell | ....... | 713/201 |
| 2003/0158962 A1* | 8/2003 | Keane et al. | ....... | 709/238 |
| 2003/0161310 A1* | 8/2003 | Dobbins et al. | ....... | 370/392 |
| 2003/0236913 A1* | 12/2003 | Hoban et al. | ....... | 709/238 |
| 2004/0059942 A1* | 3/2004 | Xie | ....... | 713/201 |
| 2004/0153574 A1* | 8/2004 | Cohen et al. | ....... | 709/245 |
| 2004/0249960 A1* | 12/2004 | Hardy et al. | ....... | 709/229 |
| 2006/0129698 A1* | 6/2006 | Rodriguez-Val et al. | .... | 709/245 |

OTHER PUBLICATIONS

J. Postel; Entitled, "Request for Comments:791-Internet Protocol—Darpa Internet Program Protocol Specification"; Sep. 1981; Available from www.ietf.org; (49 Pages).

J. Postel; Entitled, "Request for Comments: 792—Internet Control Message Protocol-Darpa Internet Program Protocol Specification"; Sep. 1981; Available from www.ietf.org; (21 Pages).

Y. Rekhter, B. Moskowitz, D. Karrenberg & G. de Groot; Entitled, "Request for Comments: 1597-Address Allocation for Private Internets"; Mar. 1994; Available from www.ietf.org; (8 Pages).

J. Reynolds. & J. Postel; Entitled,"Request for Comments: 1700-Assigned Numbers"; Oct. 1994; Available from www.ietf.org; (230 Pages).

(Continued)

*Primary Examiner*—Salad Abdullahi
(74) *Attorney, Agent, or Firm*—Narendra R. Thappeta (57) ABSTRACT

A gateway may enable an end system to determine a translated address corresponding to an original address (of the end system). The end system may embed such determined translated address into a data portion of packets sent according to a signaling protocol. Another end system may eventually receive the data portion and determine the translated address corresponding to the original address. Using the translated address, the another end system may communicate back to the end system to set up a data path.

57 Claims, 6 Drawing Sheets

OTHER PUBLICATIONS

M. Handley, H. Schulzrinne, E. Schooler & J. Rosenberg; Entitled, "Request for Comments:2543-SIP: Session Initiation Protocol"; Mar. 1999; Available from www.ietf.org; (153 Pages).

ITU-T Recommendation H.323 (Nov. 2000); Entitled: "Series H: Audiovisual and Multimedia Systems Infrastructure of audiovisual services—Systems and terminal equipment for audiovisual services. Packet-basedmultimedia communications"; Available from www.itu.int/rec/recommendation.asp?type=folders&lang=e&parent=T-REC-h.323; (258 Pages).

P. Srisuresh & K. Egevang; Entitled, "Request for Comments: 3022 -Traditional IP Network Address Translator (Traditional NAT)"; Jan. 2001; Available from www.ietf.org; (16 Pages).

* cited by examiner

ENABLING COMMUNICATION WHEN SIGNALING PROTOCOL PACKETS CONTAIN EMBEDDED ADDRESSES SUBJECT TO TRANSLATION

BACKGROUND OF THE INVENTION

1. Field of the Invention

The present invention relates to data networking protocols, and more specifically to a method and apparatus for enabling communication when signaling protocol packets contain embedded addresses subject to translation.

2. Related Art

Signaling protocols are often designed to send packets containing embedded addresses. For example, a source system may send an invite packet to a server requesting that a session be initiated with a destination system (e.g., mobile system) using Session Initiation Protocol (SIP). The server may locate the destination system and forwards at least a portion of the invite packet to the destination system, and the destination system may initiate communication with the source system using the portion.

To enable the destination system to initiate such communication, SIP may require that the IP address of the source system be included in a data portion (as opposed to header portion) of the invite packet. Accordingly, the IP address of the source system may be embedded in the invite packet. The embedded address is used by the destination system to initiate the requested session. SIP is described in further detail in RFC 2543 entitled, "SIP: Session Initiation Protocol", available from www.ietf.org and is incorporated in its entirety herewith.

Addresses are often subjected to translation, particularly when crossing the boundary of a network. For example, a gateway (at the edge of an enterprise network) implementing network address translation (NAT) may translate a source/destination address of a packet before forwarding the packet. NAT is described in further detail in RFC 3022 entitled, "Traditional IP Network Address Translator (Traditional NAT)", which is also available from www.ietf.org, and is incorporated in its entirety herewith. It is often desirable that user applications using signaling protocols operate in the presence of address translation as well.

However, address translation may present challenges for appropriate operation of such user applications. For illustration, with reference to the example in the preceding paragraphs, a gateway may translate an original address of a source system to a translated address when forwarding packets received from the source system, and to perform a reverse translation when forwarding packets to the source system. Accordingly, if the destination system uses the source system's original address to communicate with the source system, the corresponding packets may not reach the source system. As a result, the user applications may not operate as desired.

Accordingly, what is needed is a method and apparatus for enabling communication when signaling protocol packets contain embedded addresses subject to translation.

BRIEF DESCRIPTION OF THE DRAWINGS

The present invention will be described with reference to the accompanying drawings, wherein.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview and Discussion of the Invention

According to an aspect of the present invention, a source system ensures that a translation system (gateway) has a translation entry representing a mapping of a original address to a translated address. The source system retrieves the translation entry using a request. The translated address thus determined is embedded in a data portion of a packet and sent to a destination system.

As the address in the packets corresponding to such additional communication represents the translated address, the translation system may readily process the packets (by converting the translated address back to the original address). For example, an IP destination address in a received packet may represent the translated address such that a gateway merely translates the translated address back to the original address, before forwarding the packet to the source system. The destination system may use the translated address for additional communication with the source system, for example, on a data path.

In one embodiment, a source system ensures that a gateway has the translation entry by sending a request with the original address. The request causes the gateway to set the translation entry if the translation entry is not already present. In addition, the gateway sends a response with the translation entry to the source system. Thus, in such an embodiment, a single request is used to both ensure that the translation entry is present and that the translation entry is retrieved.

In an alternative embodiment, a source system may send a ping-type packet (ICMP Echo Reply) to ensure that the translation system sets the translation entry. The source system may then use SNMP-type network management protocols to retrieve the translated entry.

According to an aspect of the present invention, a source system may first determine a translated address corresponding to an original address associated with the source system. The translated address may be determined by communicating with a translation system (e.g., gateway). The source system may embed the translated address (instead of the original address) in packets sent according to a signaling protocol.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
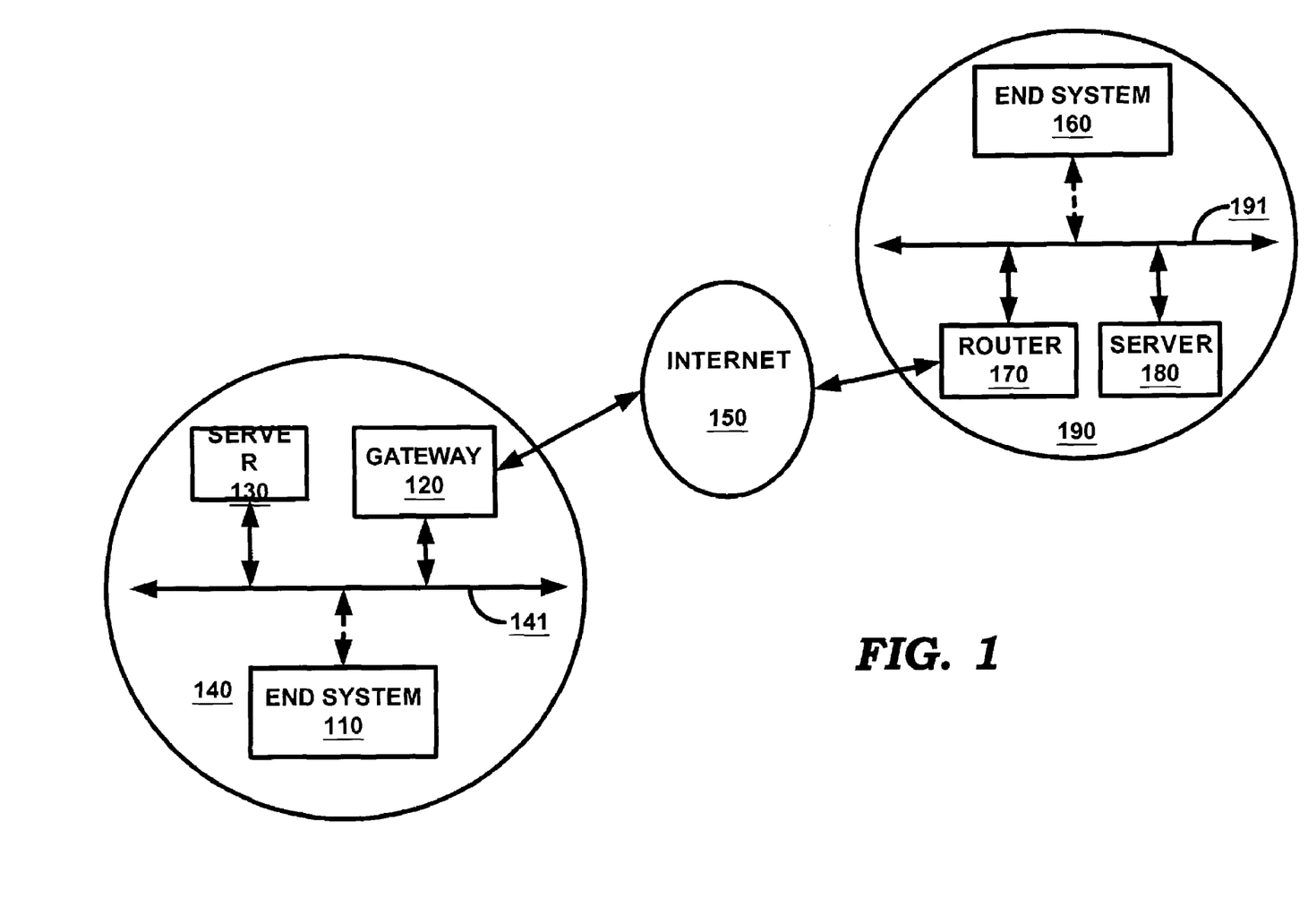
FIG. 1 is a block diagram illustrating an example environment in which the present invention can be implemented.

FIG. 1 is a block diagram illustrating the an example environment in which the present invention can be implemented. The systems in the environment are described with reference to Session Initiation Protocol (SIP) for illustration. However, the systems there can be implemented with several other protocols without departing from the scope and spirit of several aspects of the present invention, as will be apparent to one skilled in the relevant arts by reading the disclosure provided herein.

The environment is shown containing two locations 140 and 190. Location 140 is shown containing end system 110, gateway 120, and server 130 connected to network 141. Location 190 is shown containing end system 160, router 170 and server 180 connected to network 191. The operation of the systems (as relevant to an understanding of various aspects of the present invention) is described below.

Gateway 120 provides the necessary connectivity to Internet 150 enabling server 130 and end system 110 to communicate with other systems external to location 140. In addition, gateway 120 may provide network address translation (NAT) with respect to various addresses (port numbers, system/interface addresses) of end system 110. In the present application, the address assigned in the specific end system is referred to as an original address and the address resulting from translation is referred to as a translated address. Gateway 120 may also operate as a firewall blocking various accesses into and from location 140, for example, as configured by an administrator.

Server 130 enables communication to be set up to/from end system 110, and server 180 enables communication to be set up to/from end system 160. In general, servers 130 and 130 and 180 operate to provide various features, and may be implemented according to SIP in a known way. Router 170 provides layer-3 switching and may be implemented in a known way.

End systems 110 and 160 operate in conjunction with other systems of FIG. 1 to provide various user applications (e.g., Internet multimedia conferences, Internet telephone calls and multimedia distribution). Some of the user applications may require that an address (e.g., port address or IP address) associated with an end system be embedded in the data portion of a packet.

However, such an address, when used in packet headers, may be translated by a gateway. Thus, if an embedded address merely represents an original address (when a packet is being forwarded to the end system in which the original address is assigned), a gateway may not 'recognize' the address and the packet may not be forwarded to the appropriate end system.

For illustration, assuming that gateway 120 implements a translation of a original address of end system 110 to a translated address when the (original) address is present in the header of a packet sent by end system 110, and further assuming that end system 160 sends another packet with the original address (as the destination IP address) in the header, the another packet may not be forwarded by gateway 120 to end system 110. The manner in which such a situation can be avoided is described below in further details with reference to several examples.

2. Method in End System

Figure 2:
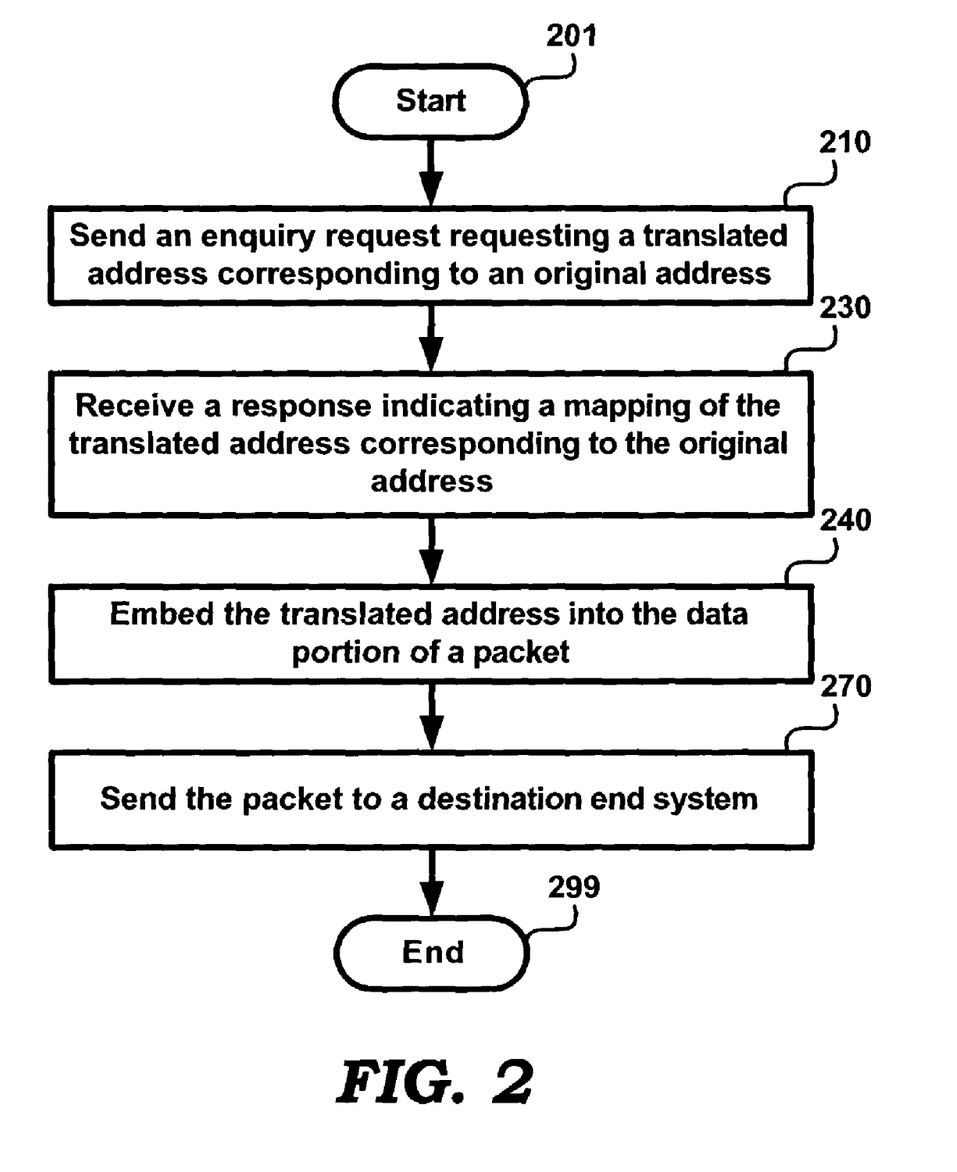
FIG. 2 is a flow-chart illustrating the manner in which an end system may send packets embedded with a translated address (instead of a original address) in an embodiment of the present invention.

FIG. 2 is a flow-chart illustrating a method using which end system 110 may generate packets containing addresses embedded in the data portions. The method is described with end system 110 and FIG. 1 for illustration only. The method can be implemented in several other end systems and environments as will be apparent to one skilled in the arts by reading the disclosure provided herein. Such implementations are also contemplated to be within the scope and spirit of several aspects of the present invention. The method begins in step 201, in which control immediately passes to step 210.

In step 210, end system 110 sends an enquiry request requesting a translated address corresponding to an original address. Such a request may be sent to a translation system (e.g., gateway 120) when a user application needs to set up a data path using a signaling protocol.

In step 230, end system 110 received a response indicating a mapping of the translated address corresponding to the original address. Various protocols and packet formats can be used for the request and response of steps 220 and 230 respectively. An example packet format using ICMP protocol is described in sections below for illustration.

In step 240, end system 110 embeds the translated address into the data portion of a packet. The rest of the packet is constructed according to the specific protocol which determines the specific packet format. In step 270, end system 110 sends the packet to a destination system (e.g, end system 160).

As the packet contains the translated address of end system 110 embedded in the received packet, end system 160 may merely use the received embedded address to communicate with end system 110. However, for translated address to be available to end system 110, gateway 120 may need to be implemented in a cooperating manner. The manner in which gateway 120 may operate is described below with examples.

3. Method in a Translation System

Figure 3:
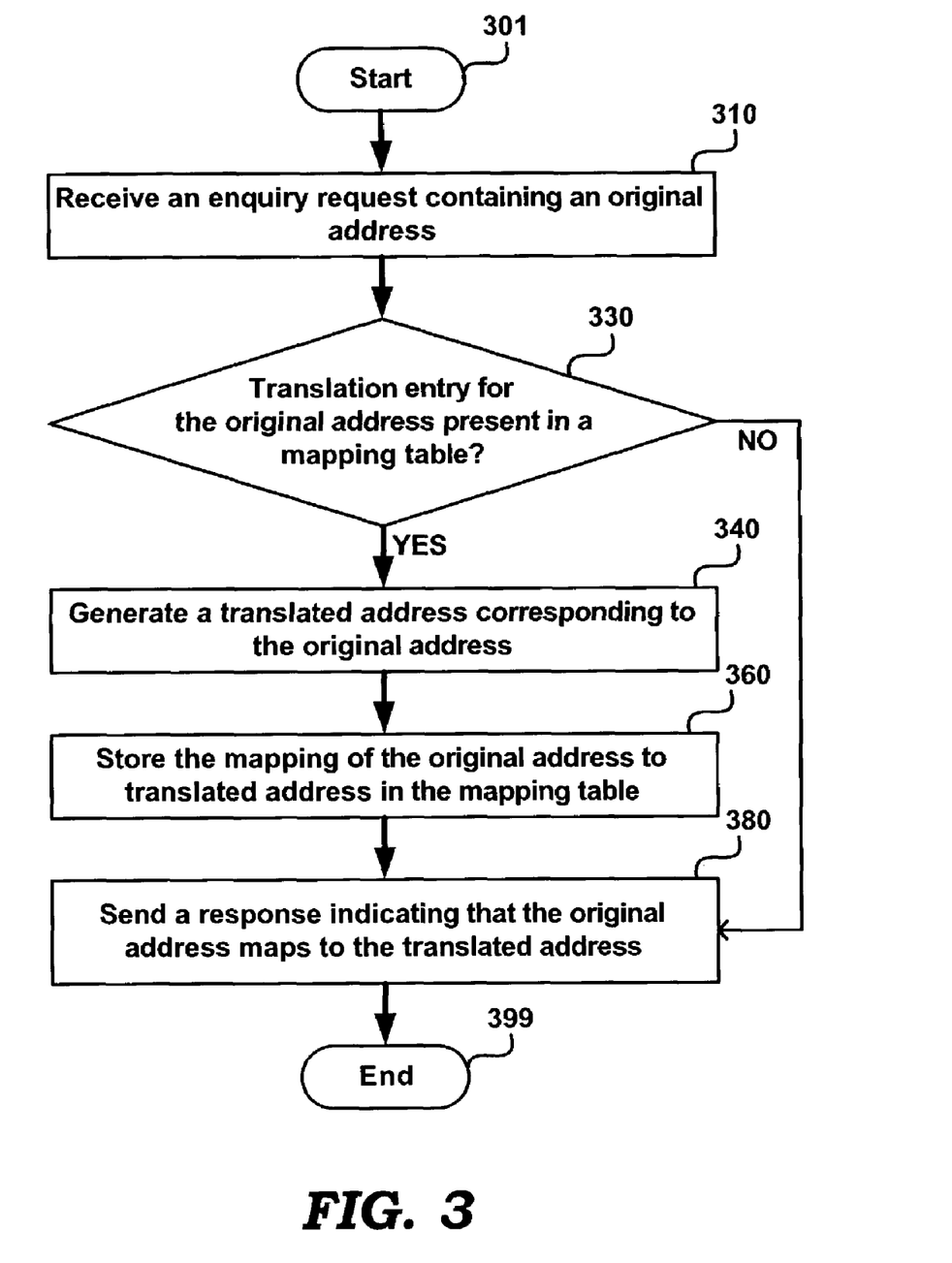
FIG. 3 is flow-chart illustrating the manner in which a gateway may support embedding of translated addresses by end systems.

FIG. 3 is a flow-chart illustrating the manner in which a translation system may operate according to an aspect of the present invention. The method is described with gateway 120 and FIG. 1 for illustration only. The method can be implemented in several other translation systems and environments as will be apparent to one skilled in the arts by reading the disclosure provided herein. Such implementations are also contemplated to be within the scope and spirit of several aspects of the present invention. The method begins in step 301, in which control immediately passes to step 310.

In step 310, gateway 120 receives an enquiry request containing an original address. The request may be received from end system 110. In step 330, gateway 120 examines a mapping table to determine whether a translation entry is present for the original address. Control passes to step 380 if the entry is present and to step 340 otherwise.

In step 340, gateway 120 generates a translated address corresponding to the original address. The translated address may be generated in a known way. In step 360, gateway 120 stores the mapping of the original address to translated address in the mapping table.

In step 380, gateway 120 sends a response to end system 110 indicating that the original address maps to the translated address. The mapping information may be used by end system 110 to embed the translated address in packets sent on signaling paths.

As noted with reference to FIG. 2, the request and response may be implemented using any protocols and packet formats. An embodiment implemented using ICMP is described below in further detail.

4. Packet Format

In one embodiment, the request and response packets are exchanged between end system 110 and gateway 120 using ICMP extensions to Internet Protocol (IP). As is well known, ICMP message is contained in the data portion of an IP packet, when IP is used as the network layer protocol. The source address, destination address and protocol type fields in the IP header are respectively set to the system (IP) address of end system 110, system address (IP address of system) of gateway 120, and 1 (indicating ICMP protocol). The following fields may be used in the ICMP message:

Type (byte 0): The next two unassigned values, which may be determined based on the information in RFC 3232 (available from www.ietf.com, and is incorporated in its entirety herewith) and via URL www.iana.org. The first value may be used to indicate that the packet pertains to a request and a second value may indicate that the packet pertains to a response;

Code (byte 1): Equal to zero;

Checksum (bytes 2-3): Checksum of all the bits forming ICMP message, assuming a Checksum of 0;

Identifier (bytes 4-5): A unique identifier of the present request/response

Information Type (byte 6): Whether the content pertains to port number or system (IP) address;

Count (byte 7): Number of information elements following this byte.

In case byte 6 indicates that the content pertains to system address, the following set of fields are replicated for a number of entries indicated by byte 7:

Original system Address (Bytes 8-11): The IP address which needs to be translated in the case of a request packet;

Translated System Address (bytes 12-15): set to 0.0.0.0 in case byte 0 indicates that the packet pertains to a request. The translation system fills the entry in a response packet. That is, this field merely serves as a place-holder in case of a request packet.

Time to Live (Bytes 16-17): Indicating when the entry should be made inactive. Set to all ones to indicate that there is no expiration time.

Inactive (Byte 18): Indicate the amount of inactive time on a data channel after which the translation entry should be deleted. A value of 0 implies immediate deletion of the entry.

In case byte 6 indicates that the content pertains to port address, the following set of fields are replicated for a number of entries indicated by byte 7:

Original Port Address (Bytes 8-9):

Translated Port Address (Bytes 10-11):

Time to Live (Bytes 12-13): Indicating when the entry should be made inactive (expire). Set to all ones to indicate that there is no expiration time.

Inactive (Byte 14): Indicate the amount of inactive time on a data channel after which the translation entry should be deleted. A value of 0 implies immediate deletion of the entry.

Other content may be included in the packet format for various extensions, as felt suitable by a designer of end system 110 and gateway 120. Thus, using a packet format such as above, end system 110 may communicate with gateway 120 to determine a translated address corresponding to a original address. The translated address thus determined, may be used to setup a data path using signaling protocols (in the presence of address translation) as described below.

5. Setting Up Data Path Using Signaling Protocols

Typically, end system 110 would use the original address (both in case of system addresses and port numbers) in the headers of packets (but embedding the translated address according to the present invention) sent to in signaling packets intended for setting up a data path. Gateway 120 translates the original address to the translated address, and forwards packets with the translated address. The packet may be forwarded, for example, to server 180.

Server 180 may encapsulate the data portion of the received packet in a new packet and send the new packet to end system 160 (assuming that the original packet is intended for end system 160 according to protocols such as SIP). End system 160 examines the content of the new packet. Based on the data portion in the new packet, end system 160 determines the specific address (i.e., the translated address) to be used to communicate with end system 110.

As the translated address itself is present embedded in the data portion of the received packet, the translated address may be used (by end system 160) in the destination address field while sending packets to end system 110. Gateway 120 replaces the translated address in the destination address field (of the header) with the original address before forwarding the packet to end system 110 (consistent with NAT or port address translation (PAT)). The packets thus exchanged can be used to set up a data path (e.g., using SIP). Data paths thus set up can be used to support several user application.

It should be understood that each feature of the present invention can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing the systems with a desired mix of hardware, software and/or firmware. An embodiment implemented substantially in software is described below.

6. Software Implementation

Figure 4:
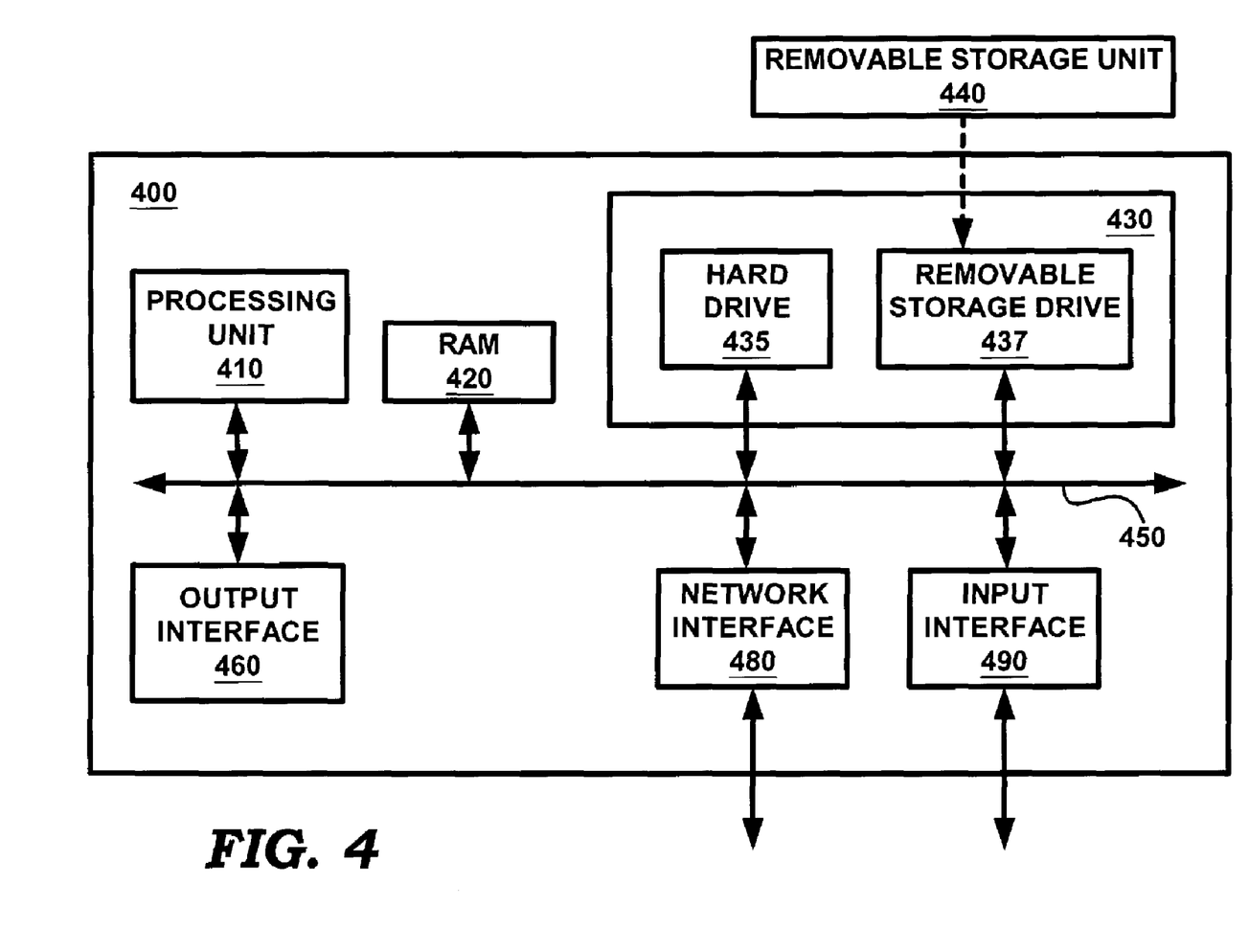
FIG. 4 is a block diagram illustrating embodiments of end system and gateways implemented substantially in the form of software.

FIG. 4 is a block diagram illustrating the details of system 400, which may represent one of end system 110 and gateway 120. System 400 is shown containing processing unit 410, random access memory (RAM) 420, storage 430, output interface 460, network interface 480 and input interface 490. Each component is described in further detail below.

Output interface 460 provides output signals (e.g., display signals to a display unit, not shown) which can form the basis for a suitable user interface for a person (e.g, administrator in the case of a gateway and a end user in the case of an end system) to interact with system 400. Input interface 490 (e.g., interface with a key-board and/or mouse, not shown) enables a person to provide any necessary inputs to system 400.

Output interface 460 and input interface 490 can be used, for example, to enable a network administrator to configure system 400 to provide various features of the present invention. Network interface 480 enables system 400 to send and receive data on communication networks using internet protocol (IP). Network interface 480, output interface 460 and input interface 490 can be implemented in a known way.

RAM 420 and storage (secondary memory) 430 may together be referred to as a memory. While the memory units are shown provided within system 400, it should be understood that the memory can be provided from external units as well (using technologies such as network file sharing, storage area networks, etc.). RAM 420 receives instructions and data on path 450 from storage 430, and provides the instructions to processing unit 410 for execution. In addition, RAM 420 may be used to implement one or more of network address translation tables present in system 400.

Secondary memory 430 may contain units such as hard drive 435 and removable storage drive 437. Secondary storage 430 may store the software instructions and data, which enable system 400 to provide several features in accordance with the present invention.

Some or all of the data and instructions may be provided on removable storage unit 440, and the data and instructions may be read and provided by removable storage drive 437 to processing unit 410. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420. In general, processing unit 410 reads sequences of instructions from various types of memory medium (including RAM 420, storage 430 and removable storage unit 440), and executes the instructions to provide various features of the present invention.

Such types of memory medium represents a computer readable medium from which processors can read and execute the instructions to provide several features of the present invention.

The description is continued with reference to an example implementation of gateway 120 using more integrated circuits.

7. Gateway

Figure 5:
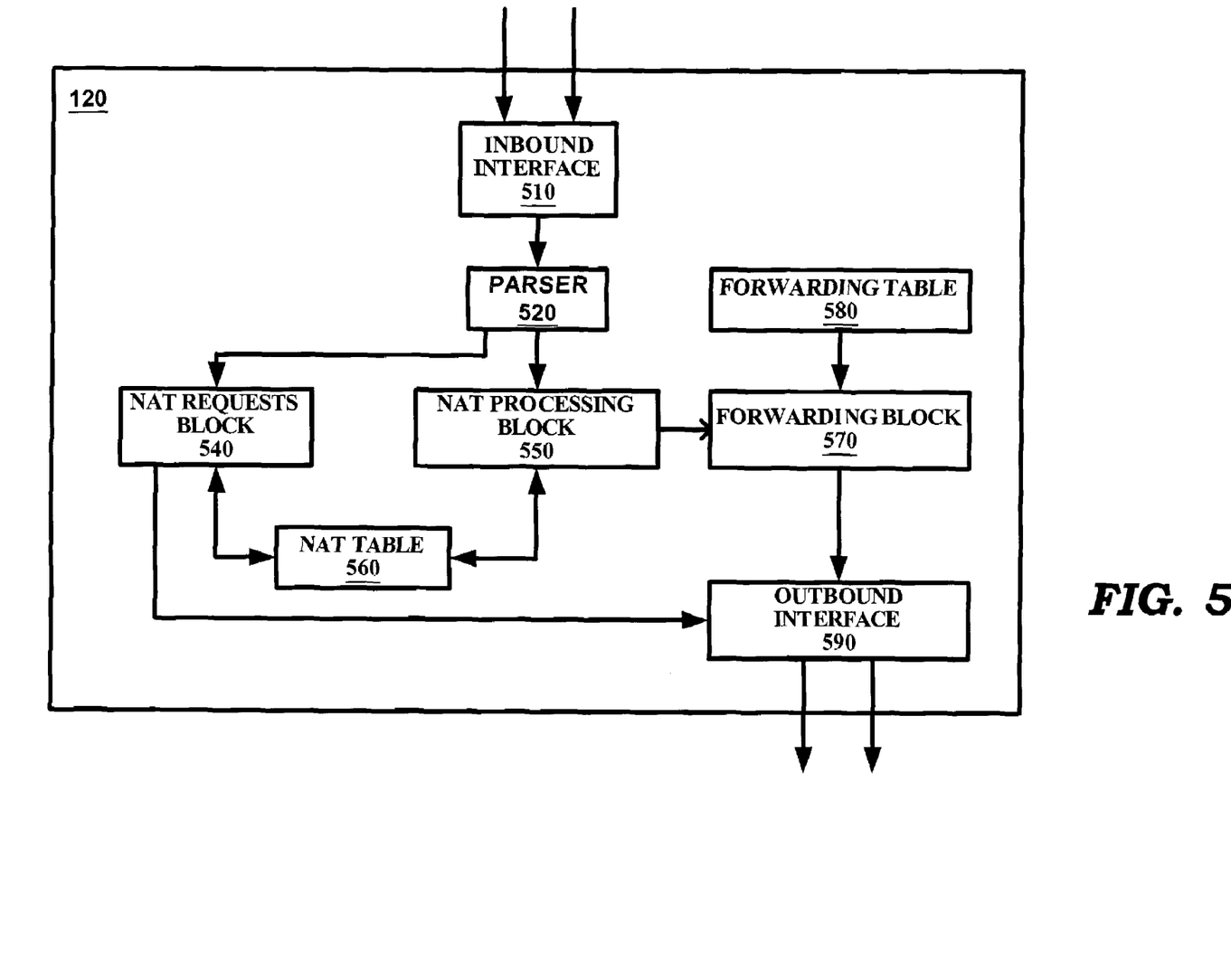
FIG. 5 is a block diagram illustrating the details of a gateway in an embodiment of the present invention and FIG. 6 is a flow-chart illustrating an alternative embodiment of an end system in according with an aspect of the present invention.

FIG. 5 is a block diagram illustrating the details of an embodiment of gateway 120 as relevant to several aspects of the present invention. Gateway 120 is shown containing inbound interface 510, parser 520, NAT requests block 540, NAT processing block 550, NAT tables 560, forwarding block 570, forwarding table 580 and outbound interface 590. Each block is described below in further detail.

Inbound interface 510 and outbound interface 590 respectively provide an electrical and protocol interfaces to receive and send internet protocol (IP) packets from/on network 141 and Internet 150. Inbound interface 510 forwards received packets to parser 520. Outbound interface 590 forwards packets received from NAT requests block 540 and forwarding block 570. Inbound interface 510 and outbound interface 590 may be implemented in a known way.

Parser 520 examines each IP packet received from inbound interface 510 to determine whether to forward packets to NAT requests block 540 or NAT processing block 550. If a packet relates to address translations information requests, the packet is forwarded to NAT requests block 540. Packets requiring additional forwarding (e.g., when destination IP address does not equal the system address of gateway 120) may be forwarded to forwarding block 570 via NAT processing block 550.

NAT requests block 540 receives any requests for translated address(es) corresponding to original addresses (including for port numbers or system addresses), and generates corresponding responses. NAT tables 560 may be examined to determine whether the corresponding translation entry already exists. If the entry does not exist, a new entry may be created and stored in NAT tables 560. NAT requests block 540 sends a response (using outbound interface 590) based on the data available in NAT tables 560.

NAT processing block 550 performs network address translation operation on various addresses (port numbers or IP addresses, typically) in the packet headers based on entries available in NAT tables 560. Forwarding block 570 may forward the packets (using outbound interface 590) based on the entries in forwarding table 580, usually based on the destination address present in the header. In general, the specific interface on which to forward the packet is determined based on the destination address.

Thus, using the description, gateways may be implemented to enable end systems to embed translated addresses into packets sent on signaling paths (at least while setting up data paths). One problem with the approach of above is that the implementation of gateway 120 needs to be modified to support such a feature. An alternative approach which can be implemented merely with changes in end system 110 is described below.

8. Alternative Embodiment

Figure 6:
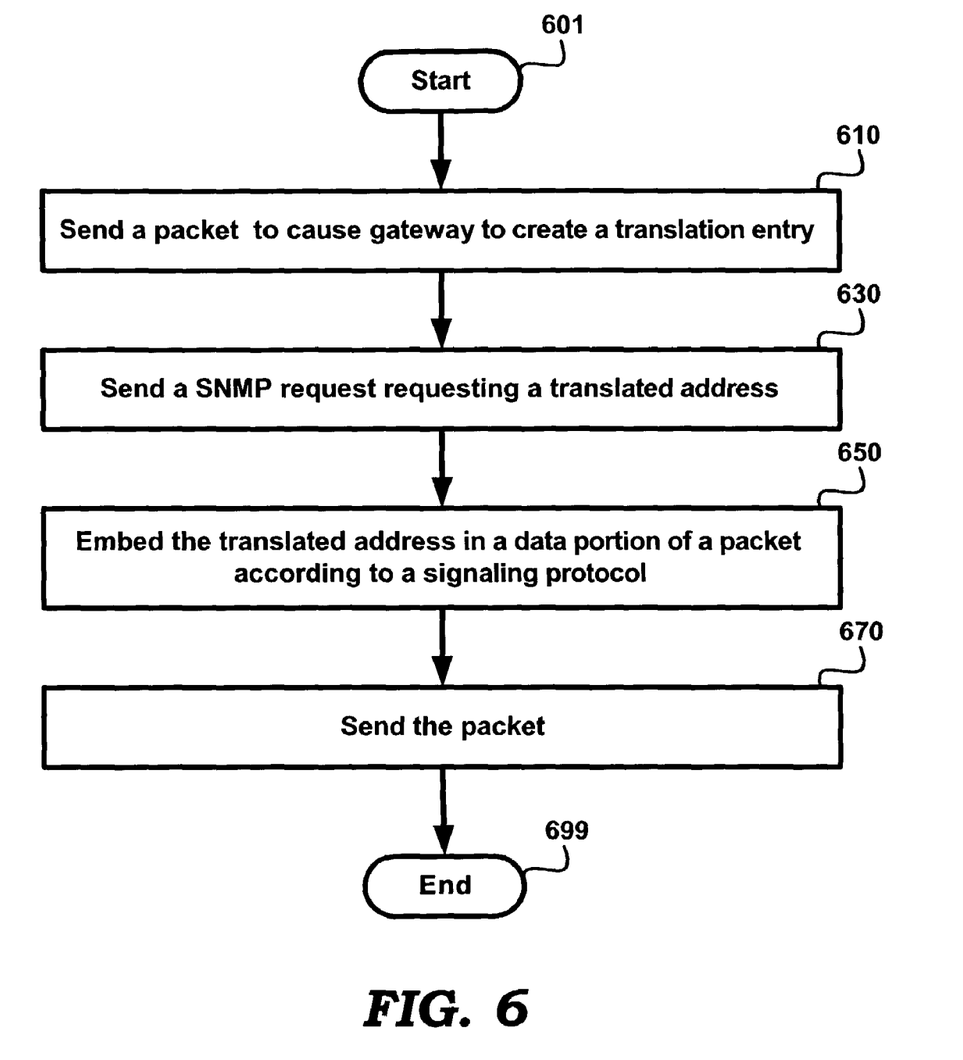

FIG. 6 is a flow-chart illustrating a method using which an alternative embodiment of an end system can be implemented according to an aspect of the present invention. The implementation may enable an end system to be implemented without potentially requiring any changes to gateways. The method is described with reference to FIG. 1 for illustration. However, the method can be implemented in several other environments and embodiments.

In step 610, end system 110 sends a packet to cause gateway to create a translation entry. For example, a ping packet (ICMP echo reply, as described in RFC 792) may be generated with the source IP address equaling the system address (IP address) of end system 110 and the packet may be sent via gateway 120. As may be readily appreciated, while forwarding the ping packet, end system 110 creates a translation entry for the source IP address if such an entry is not already present. Packets with other content may be sent to create translation entries for addresses (e.g., port number) as desired.

In step 630, end system 110 uses a protocol such as SNMP to send a request and receive the translation information. Step 630 may be performed using well known approaches. In step 650, end system 110 embeds the translated address in a data portion of a packet according to a signaling protocol. The information in the data portion may be used by another end system (e.g., 160) to setup a data path, in a known way.

Thus, it should generally be appreciated that steps 610 (and 210) are example approaches to ensure that gateway 120 contains a necessary translation entry for a original address. While step 210 also causes the translated address to be received, a method according to FIG. 6 requires additional packets to be sent to retrieve the translated address. In an embodiment, the flow-chart of FIG. 6 is implemented substantially in the form of software, as described above with reference to FIG. 4.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of sending addresses from a first end system to a second end system, said first end system having an original address, a translation system being present in a path between said first end system and said second end system, said translation system being designed to receive packets from said first end system and to send said packets to said second end system on a network, said translation system also being designed to translate said original address in said first end system to a translated address, said method being performed in said first end system, said method comprising:

sending a request to said translation system, said request containing said original address;

receiving a response from said translation system, said response containing said translated address corresponding to said original address of said first end system;

embedding said translated address of said first end system in a data portion of a first packet, said first packet containing said original address as a source address; and sending said first packet to said second end system via said translation system, wherein said translation system sends said first packet with said translated address as said source address on said network.

2. The method of claim 1, wherein said request and said response are generated according to ICMP.

3. The method of claim 2, wherein said request causes said translation system to create a translation entry if said translation entry is not present in said translation system.

4. The method of claim 1, wherein said second end system receives said data portion and sends a second packet to set up a data path to said first end system, said method further comprising receiving said second packet.

5. The method of claim 1, further comprises sending a second packet containing said original address in a header portion, wherein said second packet causes said translation system to create a translation entry representing a mapping of said original address to said translated address.

6. The method of claim 5, wherein said request and said response are generated according to a network management protocol.

7. The method of claim 6, wherein said network management protocol comprises simple network management protocol (SNMP).

8. The method of claim 1, wherein said original address comprises one of a port number and a system address of said first end system.

9. A method performed in a translation system, said translation system being present in a path between a first end system and a second end system, said translation system being designed to receive packets from said first end system and to send said packets to said second end system on a network, said translation system also being designed to translate an original address of said first end system to a translated address of said first end system, said method comprising:

receiving a request from said first end system, said request containing said original address of said first end system, wherein said request requests a mapping of said original address to said translated address of said first end system;

sending a response to said first end system, said response containing said translated address of said first end system corresponding to said original address;

receiving a first packet from said first end system, said first packet containing said translated address of said first end system in a data portion and said original address as a source address; and sending said first packet on said network to said second end system with said translated address as said source address.

10. The method of claim 9, further comprising:

checking whether said mapping is present; and determining said translated address corresponding to said original address if said mapping is not present.

11. The method of claim 10, further comprising storing said mapping in a translation table.

12. The method of claim 11, wherein said original address comprises a system address of said first system and said translation table comprises a NAT (network address translation) table.

13. The method of claim 12, wherein said request and said response are generated according to ICMP.

14. The method of claim 10, wherein said translations system comprises a gateway.

15. A computer readable medium carrying one or more sequences of instructions for causing a first end system to send addresses to a second end system, said first end system having an original address, a translation system being present in a path between said first end system and said second end system, said translation system being designed to receive packets from said first end system and to send said packets to said second end system on a network, said translation system also being designed to translate said original address in said first end system to a translated address, wherein execution of said one or more sequences of instructions by one or more processors contained in said first end system causes said one or more processors to perform the actions of:

sending a request to said translation system, said request containing said original address of said first end system;

receiving a response from said translation system, said response containing said translated address corresponding to said original address of said first end system;

embedding said translated address of said first end system in a data portion of a first packet, said first packet containing said original address of said first end system as a source address; and sending said first packet to said second end system via said translation system, wherein said translation system sends said first packet with said translated address as said source address on said network.

16. The computer readable medium of claim 15, wherein said request and said response are generated according to ICMP.

17. The computer readable medium of claim 16, wherein said request causes said translation system to create a translation entry if said translation entry is not present in said translation system.

18. The computer readable medium of claim 15, wherein said second end system receives said data portion and sends a second packet to set up a data path to said first end system, further comprising receiving said second packet.

19. The method of claim 15, further comprises sending a second packet containing said original address in a header portion, wherein said second packet causes said translation system to create a translation entry representing a mapping of said original address to said translated address.

20. The method of claim 15, wherein said request and said response are generated according to a network management protocol.

21. The method of claim 20, wherein said network management protocol comprises simple network management protocol (SNMP).

22. The method of claim 15, wherein said original address comprises one of a port number and a system address of said first end system.

23. A computer readable medium carrying one or more sequences of instructions for causing a translation system present in a path between a first end system and a second end system to receive packets from said first end system and to send said packets to said second end system on a network, said translation system also being designed to translate an original address in said first end system to a translated address, wherein execution of said one or more sequences of instructions by one or more processors contained in said translation system causes said one or more processors to perform the actions of:

receiving a request from said first end system, said request containing said original address of said first end system, wherein said request requests a mapping of said original address to said translated address of said first end system;

sending a response to said first end system, said response containing said translated address of said first end system corresponding to said original address;

receiving a first packet from said first end system, said first packet containing said translated address of said first end system in a data portion and said original address of said first end system as a source address; and sending said first packet on said network to said second end system with said translated address as a source address.

24. The computer readable medium of claim 23, further comprising additional instructions causing said one or more processors to perform the actions of:

checking whether said mapping is present; and determining said translated address corresponding to said original address if said mapping is not present.

25. The computer readable medium of claim 24, further comprising storing said mapping in a translation table.

26. The computer readable medium of claim 25, wherein said original address comprises a system address of said first end system and said translation table comprises a NAT (network address translation) table.

27. The computer readable medium of claim 26, wherein said request and said response are generated according to ICMP.

28. The computer readable medium of claim 24, wherein said original address comprises a port address.

29. A first end system for sending addresses to a second end system, said first end system having an original address, a translation system being present in a path between said first end system and said second end system, said translation system being designed to receive packets from said first end system and to send said packets to said second end system on a network, said translation system also being designed to translate said original address in said first end system to a translated address, said first end system comprising:

a network interface sending a request to said translation system, said request containing said original address of said first end system, said network interface receiving a response from said translation system, said response containing said translated address corresponding to said original address of said first end system, and a processing unit embedding said translated address in a data portion of a first packet, said first packet containing said original address of said first end system as a source address, said processing unit causing said network interface to send said first packet to said second end system via said translation system, wherein said translation system sends said first packet with said translated address as said source address on said network.

30. The first end system of claim 29, wherein said request and said response are generated according to ICMP.

31. The first end system of claim 29, wherein said request causes said translation system to create a translation entry if said translation entry is not present in said translation system.

32. The first end system of claim 29, wherein said processing unit sends a second packet containing said original address in a header portion, wherein said second packet causes said translation system to create a translation entry representing a mapping of said original address to said translated address, and wherein said request and said response are generated according to a network management protocol.

33. A translation system present in a path between a first end system and a second end system, said translation system being designed to receive packets from said first end system and to send said packets to said second end system on a network, said translation system also being designed to translate an original address in said first end system to a translated address, said translation system comprising:

an inbound interface designed to receive a request containing an original address of said first system, wherein said request requests a mapping of said original address of said first end system to a translated address, said inbound interface also receiving a first packet from said first end system, said first packet containing said translated address in a data portion, and said original address as a source address;

a processing unit designed to determine said translated address corresponding to said original address of said first end system, said processing unit also replacing in said first packet said original address as said source address with said translated address as said source address; and an outbound interface sending to send first end system a response containing said translated address corresponding to said original address of said first end system, said outbound interface also sending said first packet to said second end system with said translated address as said source address on said network, wherein said inbound interface receives said first packet after said output interface sends said response.

34. The translation system of claim 33, further comprising a memory storing said mapping in a translation table.

35. The translation system of claim 34, wherein said original address comprises a system address of said first end system and said translation table comprises a NAT (network address translation) table.

36. The translation system of claim 35, wherein said request and said response are generated according to ICMP.

37. A first end system for sending addresses to a second end system, said first end system having an original address, a translation system being present in a path between said first end system and said second end system, said translation system being designed to receive packets from said first end system and to send said packets to said second end system on a network, said translation system also being designed to translate said original address in said first end system to a translated address, said first end system comprising:
- means for sending a request to said translation system, said request containing said original address of said first end system;
- means for receiving a response from said translation system, said response containing said translated address corresponding to said original address of said first end system;
- means for embedding said translated address of said first end system in a data portion of a first packet, said first packet containing said original address of said first end system as a source address; and
- means for sending said first packet to said second end system via said translation system, wherein said translation system sends said first packet with said translated address as said source address on said network.

38. The first end system of claim 37, wherein said request and said response are generated according to ICMP.

39. The first end system of claim 38, wherein said request causes said translation system to create said translation entry if said translation entry is not present in said translation system.

40. The first end system of claim 39, wherein said request is sent according to SNMP.

41. The first end system of claim 38, wherein said original address comprises one of a port number and a system address of said first end system.

42. The first end system of claim 38, wherein said second end system receives said data portion and sends a second packet to set up a data path to said first end system, said first end system further comprising means for receiving said second packet.

43. A translation system present in a path between a first end system and a second end system, said translation system being designed to receive packets from said first end system and to send said packets to said second end system on a network, said translation system also being designed to translate an original address in said first end system to a translated address, said translation system comprising:
- means for receiving a request from said first end system, said request containing said original address of said first end system, wherein said request requests a mapping of said original address to said translated address;
- means for sending a response to said first end system, said response containing said translated address corresponding to said original address of said first end system;
- means for receiving a first packet from said first end system, said first packet containing said translated address of said first end system in a data portion; and
- means for sending said first packet to said second end system with said translated address as a source address on said network.

44. The translation system of claim 43, further comprising: means for checking whether said mapping is present; and means for determining said translated address corresponding to said original address if said mapping is not present.

45. The translation system of claim 44, further comprising storing said mapping in a translation table.

46. The translation system of claim 45, wherein said original address comprises a system address of said first end system and said translation table comprises a NAT (network address translation) table.

47. The translation system of claim 46, wherein said request and said response are generated according to ICMP.

48. The translation system of claim 44, wherein said translation system comprises a gateway.

49. A method of sending addresses from a first end system to a second end system, said first end system having an original address, a translation system being present in a path between said first end system and said second end system, said translation system being designed to receive packets from said first end system and to send said packets to said second end system on a network, said translation system also being designed to translate said original address in said first end system to a translated address, said method being performed in said first end system, said method comprising:
- embedding said translated address of said first end system in a data portion of a packet, said packet containing said original address of said first end system as a source address; and
- sending said packet to said second end system via said translation system,
- wherein said translation system sends said packet with said translated address as said source address on said network.

50. The method of claim 48, further comprising receiving said translated address from said translation system, wherein said embedding is performed after said receiving.

51. A computer readable medium carrying one or more sequences of instructions for causing a first end system to send addresses to a second end system, said first end system having an original address, a translation system being present in a path between said first end system and said second end system, said translation system being designed to receive packets from said first end system and to send said packets to said second end system on a network, said translation system also being designed to translate said original address in said first end system to a translated address, wherein execution of said one or more sequences of instructions by one or more processors contained in said first end system causes said one or more processors to perform the actions of:
- embedding said translated address in a data portion of a packet, said packet containing said original address of said first end system as a source address; and
- sending said packet to said second end system via said translation system, wherein said translation system sends said packet with said translated address as said source address on said network.

52. The computer readable medium of claim 51, further comprising receiving said translated address from said translation system, wherein said embedding is performed after said receiving.

53. A first end system for sending addresses to a second end system, said first end system having an original address, a translation system being present in a path between said first end system and said second end system, said translation system being designed to receive packets from said first end system and to send said packets to said second end system on a network, said translation system also being designed to translate said original address in said first end system to a translated address, said first end system comprising:
- a network interface; and
- a processing unit embedding said translated address in a data portion of a first packet, said first packet containing said original address of said first end system as a source address, and causes said network interface to send said first packet to said second end system via said translation system, wherein said translation system sends said first packet with said translated address as said source address on said network.

54. The first end system of claim 53, wherein said processing unit receives said translated address from said translation system.

55. A first end system for sending addresses to a second end system, said first end system having an original address, a translation system being present in a path between said first end system and said second end system, said translation system being designed to receive packets from said first end system and to send said packets to said second end system on a network, said translation system also being designed to translate said original address in said first end system to a translated address, said first end system comprising:

means for embedding said translated address of said first end system in a data portion of a packet said packet containing said original address of said first end system as a source address; and     means for sending said packet to said second end system via said translation system, wherein said translation system sends said packet with said translated address as said source address on said network.

56. The first end system of claim 55, further comprising means for receiving said translated address from said translation system, wherein said translated address is embedded after receiving said translated address.

57. A method of sending addresses from a first end system to a second end system, said first end system having an original address, a translation system being present in a path between said first end system and said second end system, said translation system being designed to receive packets from said first end system and to send said packets to said second end system on a network, said translation system also being designed to translate said original address in said first end system to a translated address, said method comprising:

sending a request from said first end system to said translation system, said request containing said original address;

receiving a response from said translation system in said first end system, said response containing said translated address corresponding to said original address of said first end system;

forming a first packet in said first end system, wherein said forming embeds said translated address of said first end system in a data portion of said first packet, said first packet containing said original address as a source address and a destination address corresponding to said second end system;

sending said first packet with said original address as said source address from said first end system to said translation system;

replacing said original address with said translated address as said source address in said translation system to form a second packet;

sending said second packet with said translated address as said source address on said network to said second end system.

\* \* \* \* \*